United States Patent [19]

Taucher

[11] 4,183,612
[45] Jan. 15, 1980

[54] OPTICAL SYSTEM FOR CREATING HIGH-INTENSITY SOLAR LIGHT BEAM

[76] Inventor: Kenneth F. Taucher, 7069 Hoover Dr., Mentor, Ohio 44060

[21] Appl. No.: 880,764

[22] Filed: Feb. 24, 1978

[51] Int. Cl.² ............................................. G02B 17/00
[52] U.S. Cl. ..................................... 350/27; 126/440; 350/299
[58] Field of Search .................... 350/27, 212, 299; 126/270, 271

[56] References Cited

U.S. PATENT DOCUMENTS

| | | | |
|---|---|---|---|
| 2,744,439 | 5/1956 | Hell, Jr. | 356/307 |
| 2,787,701 | 4/1957 | Rosin | 362/302 |
| 2,860,557 | 11/1958 | Moore et al. | 354/150 |
| 3,085,565 | 4/1963 | MaCauley | 126/270 |
| 3,802,767 | 4/1974 | Rambauske | 350/294 |
| 3,902,794 | 9/1975 | Abrams | 350/294 |
| 3,907,408 | 9/1975 | Engel | 350/294 |
| 3,963,328 | 6/1976 | Abel | 350/294 |
| 4,031,384 | 6/1977 | Sherman, Jr. | 350/299 X |
| 4,034,737 | 7/1977 | Kume | 350/299 X |
| 4,038,971 | 8/1977 | Bezborodko | 126/271 |

Primary Examiner—John K. Corbin
Assistant Examiner—Matthew W. Koren
Attorney, Agent, or Firm—Maky, Renner, Otto & Boisselle

[57] ABSTRACT

An optical system concentrates solar light energy or energy from another light or electromagnetic radiation source into a low-diverging, collimated, high-intensity beam. The optical system includes an objective lens, an input collimating lens, a fresnel-like reflecting surface, a parabolic reflector, a pinhole aperture, and output collimating lens.

19 Claims, 4 Drawing Figures

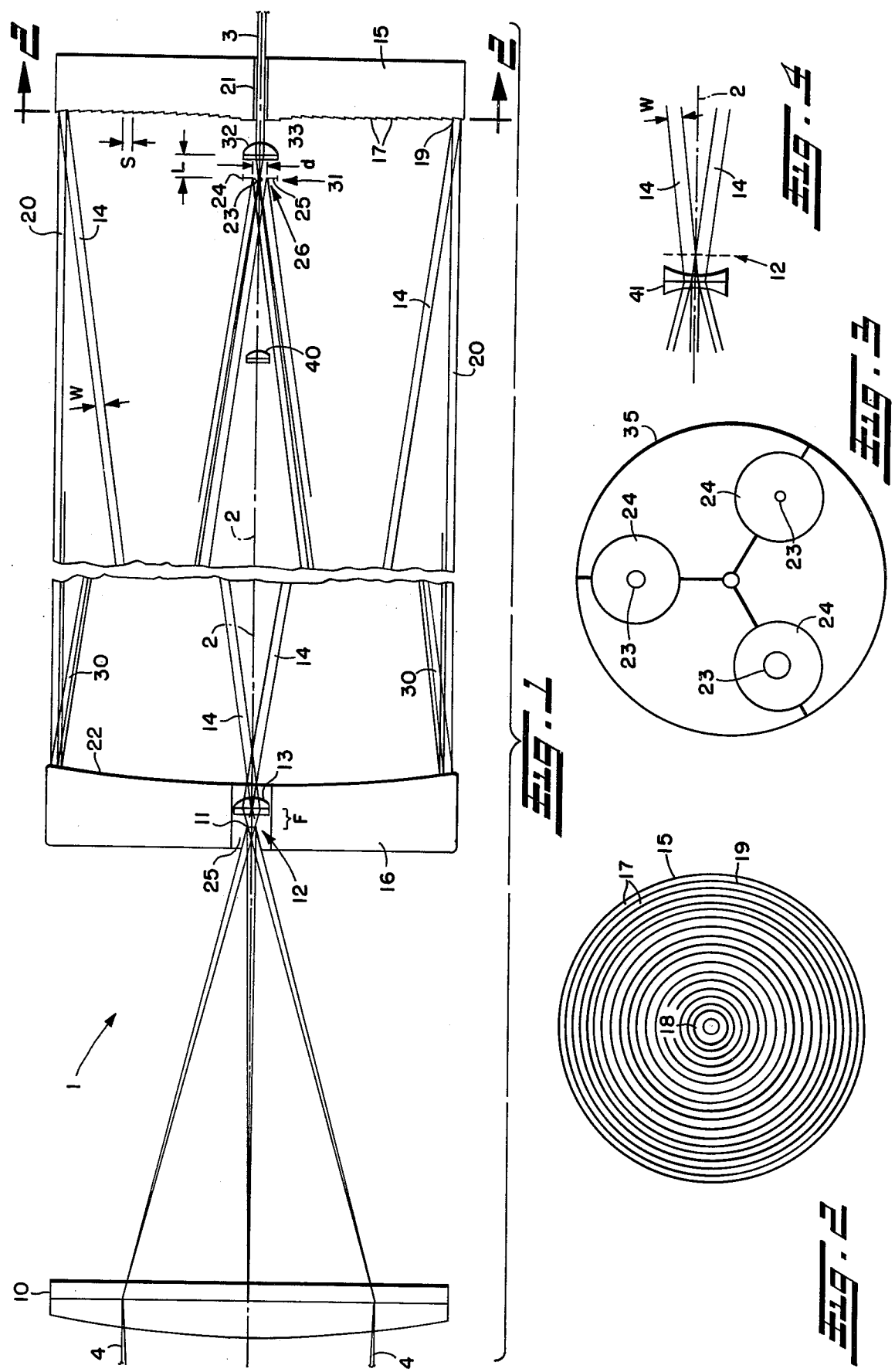

OPTICAL SYSTEM FOR CREATING HIGH-INTENSITY SOLAR LIGHT BEAM

BACKGROUND OF THE INVENTION

The present invention relates generally to optical concentrators and, more particularly, to optical systems for creating a high-intensity solar light beam.

The well-known technique of concentrating solar radiation into a small area to generate heat has been in existence since the invention of the lens itself. Recently, optical devices, such as large concave mirrors, fresnel lenses, and elongated concave reflectors, have been used as optical collectors, but these all focus sunlight onto a working surface which is at a fixed distance from the respective collector. In other words, the greatest concentration of optical energy takes place only at the focus, and the working distance is therefore highly limited. If the working surface is located out of the focal plane either toward or away from the collector, the photon intensity on this surface will not be at its maximum and, consequently, neither will be the heat flux.

A major advantage of the present invention is that when aimed at the sun, it emits a laser-like output beam (hereafter beam) of concentrated solar radiation which allows the working distance to vary over a fairly large range, i.e. the concentrated radiation is maintained for a much longer distance compared with conventional means of focusing sunlight. A small mirror could be placed in the path of the beam to aim it in a desired direction.

The beam has a very small amount of divergence, the amount of which is comparable to common lasers. Therefore, it can be used to "cut" or "bore", e.g. by burning or melting action, into materials much thicker than when using conventional methods of solar concentration. The cutting ability of the beam depends upon the material to be cut, the intensity (photon flux) of the beam, and the absorptivity of the working surface.

Another major advantage of the present optical system is that when designed accordingly, it has the capability of receiving light from sources or objects other than the sun while still forming a beam as described above. The explanation for this phenomenon is best given in the detailed description below. In most cases, however, beam intensity will not be as great as when the sun is the light source.

Along with the above mentioned uses, the beam can also be used for straight-line alignment provided its intensity is low enough as not to cause surface damage. A light source other than the sun could be used in this respect. The varying of beam intensity shall be discussed in the detailed description of the embodiment. Other solar beam uses pertain to any application requiring a high temperature in a small area, or anywhere else where a parallel, narrow light bundle proves useful.

When using a conventional solar collector such as a lens, mirror, etc., a solar light beam of the nature described in this disclosure cannot be formed by simply placing a collimating lens near the focused solar image. This is due to the fact that the sun's image, regardless of collector focal length, has a finite diameter and is not a perfect point image, the latter being a common misconception. Since the sun's image is not a point, the nearby collimating lens will form a bundle of collimated light which will diverge at a fairly rapid rate and could not properly be considered a solid, parallel beam. Likewise, a solar beam of the nature described in this disclosure cannot be formed by placing a reflective pinhole mask at a solar image with a collimating lens placed closely thereafter. The reason is that the pinhole will allow only a relatively very small portion of light from the sun's image to pass through. In the latter case the resulting beam will be essentially parallel since a pinhole aperture is used but the intensity will be comparatively low since much of the sun's image is being reflected away by the mask around the pinhole. With the present invention, a much larger amount, nearly all, of the light from the initial solar image will be used to form the beam.

SUMMARY OF THE INVENTION

It is a principal object of the invention to concentrate electromagnetic energy, such as light and, preferably, ordinary solar radiation into a high-intensity light beam.

Another object is to form a high-intensity solar light beam with the use of common, simple optical elements which are relatively easy to manufacture, and, more particularly to effect the same, using a minimum number of optical elements and combining them in a relatively small volume.

An additional object is to form a high-intensity solar light beam using an optical system of common telescope-like, cylindrical symmetry thus simplifying overall construction of housings, supporting members, tracking drives, etc.

A further object is to form a high-intensity solar light beam with an optical system which can be made capable of varying the intensity and divergence of the beam.

Another principal object is to provide an optical system fulfilling the above objectives using a light source other than the sun.

Briefly, in accordance with the invention an objective lens gathers and focuses solar radiation to form a solar image. Light from the solar image is passed through an input collimating lens and becomes collimated due to image and lens spacing. Since the solar image is not a point but has a finite diameter, the collimated light will diverge after passing through this second lens into diverging collimated light bundles which are received by a fresnel-like reflector located at a given distance from the input collimating lens. This reflector, having a plurality of flat, annular surfaces, bounces back the collimated light bundles in such a way that they no longer diverge but instead become parallel to the system optical axis. The now parallel collimated bundles strike a parabolic reflector after which they converge to a theoretical point image at the focus of the parabolic reflector where a reflector pinhole aperture mask filters out erroneous light caused by aberations, misalignment, and other errors. The pinhole mask preferably is highly reflective to minimize heat build-up from the concentrated light. The filtered light, still high in intensity, passes out of the pinhole and begins to diverge. An output collimating lens, preferably placed close to the pinhole, intercepts these diverging rays and collimates them into an intense, parallel light bundle.

These and other objects and advantages of the present invention will become more apparent as the following description proceeds.

To the accomplishment of the foregoing and related ends, the invention, then, comprises the features hereinafter fully described and particularly pointed out in the claims, the following description and annexed drawing setting forth in detail a certain illustrative embodiment of the invention, this being indicative, however, of but one of the various ways in which the principles of the invention may be employed.

BRIEF DESCRIPTION OF THE DRAWING

In the annexed drawing:

FIG. 1 is a longitudinal, cross sectional view of the complete optical concentrator system of the present invention;

FIG. 2 is a face view of the fresnel-like reflector for the system of FIG. 1 showing a series of flat, concentric, stepped surfaces;

FIG. 3 is a front view of an aperture mask arrangement on a rotatable carrier; and FIG. 4 is a partial longitudinal, cross sectional view of an alternate input collimating lens.

In all the figures, like numbers refer to like parts throughout.

DESCRIPTION OF THE PREFERRED EMBODIMENT

Referring now to the drawing and initially to FIG. 1, there is shown an optical concentrator system 1 having an optical axis 2 along which the various optical parts thereof are positioned in the usual centered and generally perpendicular relation. Although the system 1 can be used with other light sources to form a concentrated output beam 3, the sun, and particularly solar radiation rays 4 therefrom will be used to facilitate understanding of system operation.

An objective lens 10 receives solar radiation 4 to form a focused image 11 of the sun at an image plane 12. The objective lens 10 can be any positive lens capable of forming a solar image but for best operation and efficiency, the objective should be an achromat with a correction for spherical aberation. A concave mirror may be used as an objective if requirements dictate. When a light source other than the sun is used, the objective lens 10 may or may not be required depending on the optical design of the light source and/or the size of its image formed at plane 12.

Focused light from the objective 10 converges to form the image 11 and begins to diverge immediately beyond the plane 12. A positive input collimating lens 13 is placed at a distance F, one of its own focal length distance, from the image 11 such that the diverging light, when passing through lens 13, becomes collimated. In other words, light from every focused point on the image becomes a collimated or parallel bundle of light 14 after passing through lens 13. Since there is an infinite number of focused points on the image 11, there is an infinite number of collimated light bundles 14. The solar image 11 itself is not a point of condensed light but instead has a finite diameter. Thus, from the optical geometry, it can be seen that the collimated light bundles 14 will diverge away from the optical axis 2. For a given f-stop of the objective lens 10, the width W or diameter of the light bundles 14 and their angle of divergence are both a function of the distance F. The shorter the distance F is made, that is, the shorter the focal length of lens 13, the narrower the bundle width W and the larger the angle of divergence will be. Also, for a constant distance F, the larger the solar image size, the greater will be the angle of divergence from the optical axis.

At some distance from lens 13, a fresnel-like reflector 15 intercepts the expanding collimated light bundles 14 and reflects them back towards a parabolic reflector 16. Reflector 15 includes a series of flat, concentric, stepped surfaces 17 (also shown in FIG. 2) extending from the center area 18 to the outer margin 19. Each surface 17 is angled in such a way that when a collimated light bundle 14 strikes it "on center", the bundle will be reflected back as a reflected collimated bundle 20 in a direction parallel to the optical axis 2. Since the stepped surfaces are flat, the reflected light bundles 20 will remain collimated. It can be seen then that the entire expanding locus of light bundles 14 no longer expands but is made parallel after bouncing off of reflector 15. A small opening 21 at the center of reflector 15 allows the concentrated beam 3 to pass through. This opening 21 could be used as an aperture opening to help clean or filter the beam 3 of any stray light caused by imperfections in the output lens 32.

The parallel locus of collimated light bundles 20 is then bounced off parabolic reflector surface 22 and brought to a focus at the pinhole 23 of a mask 24. Like reflector 15, reflector 22 has an opening 25 at its center to permit passage of input light 14 from the input collimating lens 13. Moreover, the reflector 22 may include a conventional support to mount the input collimating lens 13 in the opening 25.

Not all of the light bundles 20 will be exactly parallel to the optical axis 2 because there are an infinite number of bundles 14 bouncing off of reflector 15 but only a finite number of flat, stepped surfaces 17 thereon. Therefore, when a light bundle 14 does not strike a flat surface 17 directly in its center, it will not be reflected exactly parallel to the optical axis 2. Consequently, after bouncing off the parabolic reflector 22, the bundle 30 will come to a focus at some small distance from the theoretical optical axis 2, i.e. it will not focus directly on the pinhole 23. Thus, the total focused light at the pinhole 23 will not be an infinitesimal point but instead a small disc of light whose photon density will be greatest at its center. The diameter d of this disc is of importance here because the smaller it is, the greater will be the amount of concentrated light passing through the pinhole 23 and, therefore, the more efficient will be the optical system 1 in forming the beam 3. It has been found by ray tracing and applying the laws of reflection that the disc diameter d is governed by three independent design parameters, namely, the stepped surface 17 width S, the light bundle 14 width W, and the focal length of the parabolic reflector 22.

In analyzing the design criteria of the stepped surface 17, the bundle 14 width W and reflector 22 focal length are to remain constant. The stepped surface 17 width S is arbitrarily made larger than the bundle 14 width W and the disc diameter d assumes a certain size. As the surface 17 width S is reduced, the disc diameter d is also reduced, but when the surface 17 width S is reduced smaller than the bundle 14 width W, the disc diameter d remains constant. In other words, there is no gain in optical performance by designing the surface 17 width S smaller than the light bundle 14 width W. Therefore, the optimum design criterion of reflector 15 is reached when the two widths, that S of the surface 17 and that W of the bundle 14, are equal in size.

In analyzing the second parameter, the light bundle 14 width W, it is found that for a fixed focal length for reflector 22, the disc diameter d decreases as the bundle 14 width W is decreased.

In looking at the third parameter, the focal length of reflector 22, the disc diameter d decreases as the focal length of reflector 22 is decreased.

Accordingly, for any particular design of the present optical system 1 it is desirable to minimize the light bundle 14 width W and the reflector 22 focal length while keeping the stepped surface 17 width S the same as the light bundle 14 width W.

It is theoretically possible to make the diameter d of the disc small enough to pass through a given pinhole 23, but with optical errors such as aberation, diffraction, etc., it is virtually impossible in practice to produce a focus spot small enough to pass entirely through a pinhole. Therefore, the pinhole 23 should have a mask 24 that is highly reflective on the side 25 facing the parabolic reflector 22, so that the optical errors in the focus spot or area of concentration 26 at the focal plane 31 of the reflector 22 at which the mask 24 is located, are reflected back into the optical system 1 without producing an intense heat build-up around the pinhole 23. The light at this focus spot 26 is highly concentrated and the reflective mask 24 then acts as a filter in that the light which forms the beam 3 is only that light which is made error-free by the pinhole aperture 23.

Concentrated light passes through the pinhole 23 and begins to diverge immediately thereafter. A positive output collimating lens 32 is placed at a distance L, its focal length distance, from the pinhole 23 so that this diverging light 33, when passing through lens 32, becomes collimated to form a narrow beam 3. As the distance L is made smaller, that is, the shorter the focal length of lens 32 in any given design, the narrower and more intense the beam 3 will be. Since the pinhole aperture 23 is very small compared to the distance L, the beam divergence will be very small and the beam intensity will remain relatively constant over a given length. Thus, the light in beam 3 will be concentrated and very near parallel to the optical axis 2. For greater beam efficiency, the mask 24 and lens 32 preferably are mounted between the reflectors 15, 22, although they may be positioned optically beyond the reflector 15.

It is possible to provide a conventional means, such as a rotatable carrier 35 with suitable open support structure, by which a number of masks 24 with pinholes 23 of different diameters are interchangeably rotated into the area of concentration 26. A smaller pinhole 23 diameter will produce a beam 3 of smaller divergence but also will reduce its intensity. A larger pinhole diameter will produce a more intense beam 3 since more concentrated light is passed but its amount of divergence is also larger. The desired divergence and intensity of any particular beam 3 will depend on the application or requirement.

A positive lens 40 optionally may be used to help direct light bundles 14 close to the optical axis 2 into the pinhole aperture 23 since reflectors 15 and 22 have non-usable center openings. Lens 40 is positioned whereby the light bundles 14, after passing through it, are brought to a focus at the pinhole 23 so that lens 40 effectively adds additional concentrated light to the beam 3.

In FIG. 4, a negative lens 41 is used as an alternate input collimating lens for collimating the solar image radiation from the objective lens 10. Lens 41 is positioned between the objective lens 10 and the image plane 12 thereof such that converging light from the objective 10 is collimated by passing through lens 41 to form the collimated light bundles 14. The parameters governing the light bundle 14 width W and its angle of divergence from the optical axis 2 are the same as for the positive input collimating lens 13.

It will, of course, be appreciated that the several optical elements of the invention may be replaced by one or more functionally equivalent elements. For example, the fresnel-like reflector 15 may be replaced by a fresnel-like lens and/or the parabolic reflector 22 by a functionally equivalent lens. These and the other lenses may be replaced by functionally equivalent lenses, reflectors or combinations thereof. Masks other than the pinhole aperture 23 mask 24 may be employed. Moreover, although the optical axis 2 is preferably a straight line, it can be bent or folded one or more times, as desired. The foregoing variations are within the spirit and scope of the invention.

The embodiments of the invention in which an exclusive property or privilege is claimed are defined as follows:

1. An optical concentrator, comprising:
   input means for delivering a plurality of relatively diverging collimated light bundles;
   converging means for converging said plurality of diverging collimated light bundles and each of the same to an area of concentration; and
   output means for substantially collimating light from said area of concentration to form a relatively concentrated, substantially collimated output beam.

2. The concentrator of claim 1, wherein said input means comprises an objective lens.

3. The concentrator of claim 2, wherein said input means further comprises a negative collimating lens positioned between said objective lens and the focal plane of the latter.

4. The concentrator of claim 2, wherein said input means further comprises a positive collimating lens positioned approximately at the focal plane of said objective lens.

5. The concentrator of claim 1, wherein said input means is positioned to receive solar radiation, and wherein said input means includes means for forming from such solar radiation such relatively diverging collimated light bundles.

6. The concentrator of claim 1, wherein said converging means comprises a fresnel-like reflector.

7. The concentrator of claim 6, wherein said converging means further comprises a parabolic reflector, said fresnel-like reflector being positioned with respect to said input means to direct such relatively diverging collimated light bundles in parallel paths toward said parabolic reflector, and wherein said parabolic reflector is positioned relative to said fresnel-like reflector to concentrate such light bundles received therefrom at an area of concentration.

8. The concentrator of claim 7, wherein both of said reflectors are aligned on a common optical axis and both have substantially centrally located openings therethrough, said opening in said parabolic reflector being positioned relative to said input means for passing such relatively diverging collimated light bundles toward said fresnel-like reflector and said opening in said fresnel-like reflector being positioned to pass said output beam.

9. The concentrator of claim 8, wherein said input means comprises collimating lens means for forming such relatively diverging collimated light bundles, said collimating lens means being mounted in said opening of said parabolic reflector.

10. The concentrator of claim 8, further comprising concentrating means for directing light passing through said opening in said parabolic reflector and substantially paralleling such optical axis toward such output means.

11. The concentrator of claim 8, wherein said output means comprises aperture means positioned at said area of construction for passing only a portion of the light thereat.

12. The concentrator of claim 11, wherein said output means further comprises output collimating lens means for substantially collimating light passing through such aperture means.

13. The concentrator of claim 11, wherein said aperture means further comprises mask means for blocking light not passed by said aperture means and reflective coating means on the input side of such mask means for reflecting light not passed by said aperture means.

14. The concentrator of claim 1, wherein said converging means comprises a parabolic reflector.

15. The concentrator of claim 1, wherein said output means comprises optical filtering means for filtering non-concentrically converging light from said area of concentration.

16. The concentrator of claim 1, wherein said output means comprises aperture means positioned at said area of concentration for passing only a portion of the light thereat.

17. The concentrator of claim 16, wherein said output means further comprises output collimating lens means for substantially collimating light passing through said aperture means.

18. The concentrator of claim 16, wherein said aperture means comprises a support, a plurality of light blocking masks mounted in said support, and a respective different size aperture in each of said masks, and wherein said support is movably positioned selectively to position respective masks and apertures at said area of concentration.

19. The concentrator of claim 16, wherein said aperture means further comprises mask means for blocking light not passed by said aperture means and reflective coating means on the input side of said masked means for reflecting light not passed by said aperture means.

* * * * *